United States Patent Office 3,583,990
Patented June 8, 1971

3,583,990
10-HYDROXY-11-PIPERAZINYL-DIBENZO-CYCLOHEPTADIENES
Jean Clement Louis Fouche, Bourg-la-Reine, and Robert Gaumont, Issy-les-Moulineaux, France, assignors to Rhone-Poulenc S.A., Paris, France
No Drawing. Filed Dec. 18, 1967, Ser. No. 691,183
Claims priority, application France, Jan. 11, 1967, 90,704, Patent 1,532,293
Int. Cl. C07d *51/64, 51/68, 51/70*
U.S. Cl. 260—268                6 Claims

ABSTRACT OF THE DISCLOSURE

The invention provides new 10-hydroxy-11-piperazinyldibenzo[a,d]cycloheptadienes which are useful inter alia as anti-migraine and anti-serotonin agents.

---

This invention relates to dibenzoheptadiene derivatives and their preparation.

The present invention provides the dibenzo[a,d]cycloheptadiene derivatives of the formula:

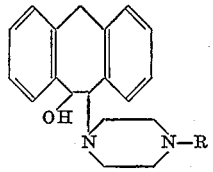

(I)

and their acid addition salts and quaternary ammonium derivatives, in which R represents a hydrogen atom or an alkyl, hydroxyalkyl, hydroxyalkoxyalkyl, alkenyl, alknyl, phenyl, phenlyalkyl (e.g. benzyl) or phenylalkenyl radical, in which the phenyl nucleus is unsubstituted or substituted by one or more halogen atoms or alkyl, alkoxy, nitro, amino or trifluoromethyl radicals, and the piperazine nucleus is unsubstituted or substituted by one or more methyl radicals. The alkyl, alkenyl, and alkynyl radicals mentioned herein, and the alkyl and alkenyl portions of the various other radicals contain up to 5 carbon atoms each.

The dibenzo[a,d]cycloheptadiene derivatives of Formula I may be prepared by one of the following processes:

(1) By reduction of dibenzo[a,d]cycloheptadiene derivative of the formula:

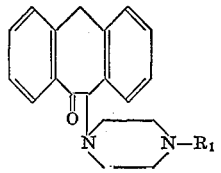

(II)

in which $R_1$ is the same as R or an alkanoyl radical of 1 to 5 carbon atoms, more especially formyl or acetyl, and the piperazine nucleus is unsubstituted or substituted by one or more methyl radicals, by any process capable of reducing a ketone group to a secondary alcohol group without altering the remainder of the molecule.

It is advantageous to use an excess of potassium borohydride or sodium borohydride as the reducing agent and to work in an aqueous alcoholic mixture, the alcohol being a primary lower alcohol which is miscible with water.

Where $R_1$ represents an alkanoyl radical the reduction is followed by a deacylation, for example by heating an aqueous alcoholic alkaline solution of the reduction product.

The compounds of Formula I wherein R represents a hydrogen atom may be prepared directly by reducing the compounds of Formula II wherein $R_1$ is a hydrogen atom, but are preferably prepared by reduction, followed by deacylation, of a compound of Formula II wherein $R_1$ represents an alkanoyl radical, because it is more convenient to prepare compounds of Formula II wherein $R_1$ represents such a radical than to prepare compounds of Formula II wherein $R_1$ represents a hydrogen atom.

(2) When R in Formula I is not hydrogen or a phenyl radical, by reaction of a reactive ester of the formula:

(III)

in which X represents a reactive ester residue such as a halogen atom or a sulphuric or sulphonic ester residue (for example a methanesulphonyloxy or p-toluenesulphonyloxy residue) and $R_2$ is the same as R but is not hydrogen or a phenyl radical with a dibenzo[a,d]cycloheptadiene derivative of the formula:

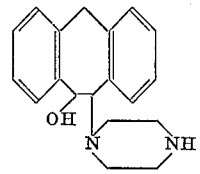

(IV)

in which the piperazine nucleus is unsubstituted or substituted by one or more methyl radicals. It is advantageous to work in an inert organic solvent such as dimethylformamide, preferably at the boiling point of the solvent, in the presence of sodium bicarbonate.

The compounds of Formula II may be prepared by reaction of a dibenzo[a,d]cycloheptadiene derivative of the formula:

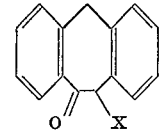

(V)

in which X is as defined above, with a piperazine of the formula:

(VI)

in which the symbol $R_1$ is as defined above and the piperazine nucleus is unsubstituted or substituted by one or more methyl radicals. It is advantageous to work in an inert organic solvent such as an aromatic hydrocarbon, preferably at the boiling point of the solvent, and to use an excess of the piperazine of Formula VI as the condensation agent.

The derivatives of Formula I and their salts may optionally be purified by physical methods, such as distillation, crystallisation or chromatography, or by chemical methods, such as the formation of salts, crystallisation of these followed by decomposition in an alkaline medium. In these operations the nature of the anion of the salt does not matter, the only condition being that the salt should be well defined and easily crystallisable.

The bases of Formula I may be converted into addition salts and quaternary ammonium derivatives. The acid addition salts may be obtained by reacting the bases with acids in appropriate solvents, e.g. organic solvents such as alcohols, ethers, ketones or chlorinated solvents. The resulting salt precipitates, after concentration of its solution if necessary, and is isolated by filtration or decantation. The quaternary ammonium derivatives may be obtained by reacting the new bases with esters, optionally in an organic solvent, at ordinary temperature, or more rapidly, with gentle heating.

The derivatives of Formula I and their acid addition salts and quaternary ammonium derivatives exhibit interesting pharmacodynamic properties. They are very active as anti-migraine and anti-serotonin agents; they also have a strong effect on the central nervous system, as sedatives and anti-depressants. They have given good results in physiological experiments with animals at doses of 0.1 to 50 mg. per kg. of animal weight, administered orally or subcutaneously.

For medicinal use the new compounds are used either as the bases or as pharmaceutically acceptable acid addition salts or quaternary ammonium derivatives, that is to say salts or derivatives which are non-toxic at the doses used. Examples of pharmaceutically acceptable acid addition salts are salts with inorganic acids (such as the hydrochlorides, sulphates, nitrates or phosphates) or organic acids (such as the acetates, propionates, succinates, benzoates, fumarates, maleates, tartrates, theophyllineacetates, salicylates, phenolphthalinates and methylene bis-β-hydroxynaphthoates) or the substituted derivatives of these acids. Examples of pharmaceutically acceptable quaternary ammonium derivatives are derivatives of inorganic or organic esters such as alkyl, allyl, or benzyl halides, sulphates, or benzenesulphonates or substituted derivatives of these esters.

The following examples illustrate the invention.

EXAMPLE 1

10 - oxo - 11 - (4-methyl-1-piperazinyl)dibenzo[a,d]cycloheptadiene dihydrochloride (25.0 g.) dissolved in a mixture of methanol (300 cc.) and 10 N caustic soda (13.2 cc.) is treated with potassium borohydride (8.0 g.) dissolved in distilled water (80 cc.). The reaction mixture is stirred at ambient temperature for 16 hours. After evaporating the solvents under reduced pressure (20 mm. Hg), the residue is taken up in diethyl ether (300 cc.) and a N aqueous solution of methane-sulphonic acid (320 cc.). The two limpid phases obtained are separated. The aqueous solution is rendered alkaline with 10 N caustic soda (50 cc.). The oil which separates out is extracted three times with methylene chloride (a total of 450 cc.). The combined methylene chloride solutions are washed with water until neutral and then dried over anhydrous magnesium sulphate and evaporated. The crystalline residue (16.0 g.) is dissolved in boiling ethyl acetate (60 cc.). After 3 hours cooling at 3° C., the crystals which have appeared are filtered off, washed 3 times with ice-cold ethyl acetate (a total of 15 cc.) and dried under reduced pressure (20 mm. Hg). 10-hydroxy-11 - (4-methyl-1-piperazinyl)dibenzo[a,d]cycloheptadiene (13.0 g.), M.P. 142–144° C., is obtained.

10 - oxo - 11 - (4-methyl-1-piperazinyl)dibenzo[a,d]cycloheptadiene dihydrochloride (40.0 g.) containing 7% of water of crystallisation and melting at about 202° C. is obtained by reaction of 1-methyl-piperazine (48.6 g.) with 10 - oxo - 11 - bromo-dibenzo[a,d]cycloheptadiene (46.5 g.) in toluene under reflux, followed by addition of anhydrous hydrogen chloride to an ethanolic solution of the crude base.

The 10 - oxo - 11 - bromo-dibenzo[a,d]cycloheptadiene starting material (melting point=78° C.) is prepared by the method of Rigaudy et al., Bull. Soc. Chim. France 1959, 642.

EXAMPLE 2

10 - oxo - 11 - (4 - ethyl-1-piperazinyl)dibenzo[a,d]cycloheptadiene dihydrochloride (14.0 g.) dissolved in methanol (200 cc.) and 10 N caustic soda (6.3 cc.) is treated with a solution of potassium borohydride (3.83 g.) in distilled water (38 cc.). After one night at ambient temperature, the greater part of the methanol is evaporated under reduced pressure (20 mm. Hg) and the residue is taken up in distilled water (350 cc.) and methylene chloride (250 cc.). The separated aqueous solution is washed with diethyl ether (300 cc.). The combined organic solutions are washed with distilled water until neutral, dried over anhydrous sodium sulphate and evaporated. The residue (10.0 g.) is dissolved in boiling acetonitrile (30 cc.). After 3 hours cooling at 3° C., the crystals which have appeared are filtered off, washed 3 times with ice-cold acetonitrile (a total of 9 cc.) and dried under reduced pressure (20 mm. Hg). 10-hydroxy-11-(4-ethyl-1-piperazinyl)dibenzo[a,d]cycloheptadiene (8.1 g.), M.P. 134–135° C., is obtained.

10 - oxo - 11 - (4-ethyl-1-piperazinyl)dibenzo[a,d]cycloheptadiene dihydrochloride (15.0 g.), M.P. 195° C. is obtained by reaction of 1-ethyl-piperazine (17.8 g.) with 11-bromo-10-oxo-dibenzo[a,d]cycloheptadiene (15.0 g.) followed by addition of anhydrous hydrogen chloride to the crude base.

EXAMPLE 3

Working as in Example 2, a crude base (7.5 g.) is obtained from 10 - oxo - 11 - (4-benzyl-1-piperazinyl)dibenzo[a,d]cycloheptadiene dihydrochloride (14.5 g.) and potassium borohydride (3.5 g.). This crude product, dissolved in anhydrous ethanol (50 cc.), is treated with an anhydrous solution (10 cc.) of hydrogen chloride in diethyl ether (containing 4.0 mols of hydrogen chloride per litre of solution). After 17 hours cooling at 3° C., the crystals which have appeared are filtered off, washed 3 times with ice-cold ethanol (a total of 21 cc.) and then twice with anhydrous diethyl ether (a total of 40 cc.), and dried under reduced pressure (20 mm. Hg). 10-hydroxyl - 11 - (4 - benzyl - 1 - piperazinyl)dibenzo[a,d]cycloheptadiene dihydrochloride (6.8 g.), M.P. about 225° C., is obtained.

10 - oxo - 11 - (4-benzyl-1-piperazinyl)dibenzo[a,d]cycloheptadiene dihydrochloride (15.0 g.), M.P. 200° C. is obtained from 11 - bromo - 10 - oxo-dibenzo[a,d]cycloheptadiene (13.5 g.) and 1 - benzyl-piperazine (24.8 g.).

EXAMPLE 4

A crude base (10.1 g.) is obtained from 10-oxo-11-[4 - (4 - methoxybenzyl) - 1 - piperazinyl]dibenzo[a,d]cycloheptadiene dihydrochloride (14.0 g.) and potassium borohydride (3.2 g.) by working as in Example 2. 10-hydroxy - 11 - [4 - (4-methoxybenzyl)-1-piperazinyl]dibenzo[a,d]cycloheptadiene dihydrochloride (9.5 g.), M.P. about 210° C., is obtained by working as in Example 3.

10 - oxo - 11 - [4-(4-methoxybenzyl) - 1 - piperazinyl]dibenzo[a,d]cycloheptadiene dihydrochloride (15.0 g.), M.P. 200° C. is obtained from 10 - oxo - 11 - bromo-dibenzo[a,d]cycloheptadiene (11.5 g.) and 1-(4-methoxybenzyl)piperazine (24.7 g.).

The present invention includes within its scope pharmaceutical compositions containing, as active ingredient, at least one dibenzo[a,d]cycloheptadiene of Formula I, or a pharmaceutically acceptable acid addition salt or quaternary ammonium derivative thereof, in association with a pharmaceutical carrier or coating. Such compositions may be in a form suitable for oral, parenteral or rectal administration.

Solid compositions for oral administration include tablets, pills, powders and granules. In these compositions the active product is mixed with one or more inert diluents such as sucrose, lacetose or starch. These compositions may also comprise substances other than diluents, for example a lubricant such as magnesium stearate.

Liquid compositions for oral administration include pharmaceutically acceptable emulsions, solutions, suspensions, syrups and elixirs containing inert diluents commonly used in the art, such as water or liquid paraffin. These compositions may also comprise substances other than diluents, for example wetting emulsifying and suspending agents, sweeteners, flavours, or perfumes.

The compositions of the invention for oral administration also include capsules of absorbable materials such as gelatin containing the active substance, with or without diluents or excipients.

The compositions according to the invention for parenteral administration may be sterile aqueous or non-aqueous solutions, suspensions or emulsions. Examples of non-aqueous solvents or vehicles include propylene glycol, polyethylene glycol, vegetable oils, particularly olive oil, and organic injectable esters, for example ethyl oleate. These compositions may also contain adjuvants, particularly preservatives, wetting agents, emulsifiers and dispersing agents. Sterilisation may be carried out in various ways, for example by filtration through a bacteriological filter, by incorporating sterilising agents into the composition, by irradiation or by heating. They may also be prepared in the form of solid sterile compositions which may be dissolved in sterile water or any other sterile injectable medium at the time of use.

Compositions for rectal administration may be suppositories which contain in addition to the active product excipients such as cacao butter or suppository wax.

The percentage of active ingredient may be varied, e.g. from 0.1 to 95% by weight, provided that an adequate dose is contained in a convenient amount of composition. The dosage depends on the desired therapeutic effect, the method of administration and the duration of the treatment; orally, generally between 2 and 500 mg. of active product per day for an adult may be administered.

The following examples illustrate pharmaceutical compositions of the invention.

EXAMPLE A

Tablets of the following composition are prepared by the usual technique:

| | Mg. |
|---|---|
| 10-hydroxy-11-(4-methyl-1-piperazinyl)dibenzo[a,d]cycloheptadiene | 5 |
| Starch | 110 |
| Colloidal silica | 32 |
| Magnesium stearate | 3 |

EXAMPLE B

Tablets of the following composition are prepared by the usual technique:

| | Mg. |
|---|---|
| 10-hydroxy-11-(4-methyl-1-piperazinyl)dibenzo[a,d]cycloheptadiene | 25 |
| Starch | 92 |
| Colloidal silica | 30 |
| Magnesium stearate | 3 |

We claim:
1. A dibenzo[a,d]cycloheptadiene of the formula:

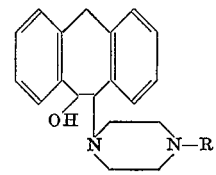

and its non-toxic acid addition salts, in which R is a hydrogen atom or an alkyl, hydroxyalkyl, hydroxyalkoxyalkyl, alkenyl, alkynyl, phenyl, phenylalkyl or phenylalkenyl group in which the phenyl nucleus is unsubstituted or substituted by alkoxy, and the piperazine nucleus is unsubstituted or C-substituted by methyl, and each alkyl, alkenyl or alkynyl group and the alkyl and alkenyl portions of the alkyl- and alkenyl-containing radicals contain up to 5 carbon atoms.

2. A dibenzo[a,d]cycloheptadiene as claimed in claim 1 and its non-toxic acid addition salts in which R is alkyl containing up to 5 carbon atoms, benzyl or alkoxy (containing up to 5 carbon atoms)-benzyl.

3. A dibenzo[a,d]cycloheptadiene as claimed in claim 1, which is 10-hydroxy-11-(4-methyl-1-piperazinyl)dibenzo[a,d]cycloheptadiene and its non-toxic acid addition salts.

4. A dibenzo[a,d]cycloheptadiene as claimed in claim 1 which is 10-hydroxy-11-(4-ethyl-piperazinyl)dibenzo[a,d]cycloheptadiene and its non-toxic acid addition salts.

5. A dibenzo[a,d]cycloheptadiene as claimed in claim 1 which is 10-hydroxy-11-(4-benzyl-1-piperazinyl)dibenzo[a,d]cycloheptadiene and its non-toxic acid addition salts.

6. A dibenzo[a,d]cycloheptadiene as claimed in claim 1 which is 10-hydroxy-11-[4-(4-methoxybenzyl)-1-piperazinyl]dibenzo[a,d]cycloheptadiene and its non-toxic acid addition salts.

References Cited
UNITED STATES PATENTS
3,370,061  2/1968  Corts _____ 260—268X
2,478,048  1/1969  Edenhofer _____ 260—268X DONALD G. DAUS, Primary Examiner